United States Patent [19]

Phillips

[11] 4,011,413
[45] Mar. 8, 1977

[54] HOLD CIRCUIT FOR TELEPHONE
[75] Inventor: Robert C. Phillips, Chicago, Ill.
[73] Assignee: Gimix, Inc., Chicago, Ill.
[22] Filed: Jan. 12, 1976
[21] Appl. No.: 648,473
[52] U.S. Cl. .............................. 179/81 R; 179/99
[51] Int. Cl.² ........................................ H04M 1/00
[58] Field of Search ........................... 179/81 R, 99

[56] References Cited
UNITED STATES PATENTS

| | | | |
|---|---|---|---|
| 3,246,082 | 4/1966 | Levy | 179/99 |
| 3,598,924 | 8/1971 | Zucker | 179/99 |
| 3,725,600 | 4/1973 | Hutton | 179/99 |
| 3,742,151 | 6/1973 | Ruether | 179/99 |
| 3,870,831 | 3/1975 | McCarley | 179/99 |

*Primary Examiner*—William C. Cooper
*Assistant Examiner*—Joseph A. Popek
*Attorney, Agent, or Firm*—Leydig, Voit, Osann, Mayer & Holt, Ltd.

[57] ABSTRACT

An electronic hold circuit for a telephone. A single sensing and latching module is connected across the telephone lines, and is adapted to sense the voltage present on the telephone lines to distinguish between on-hook, off-hook and hold conditions. The hold feature is engagable by one or more hold signaling modules disposed, for example, near each telephone and extension telephone in the system. Each hold signaling module comprises a switch associated with a level establishing device, for establishing a voltage on the telephone lines at a level intermediate the relatively high on-hook voltage and the relatively low off-hook voltage. The sensing and latching module responds to this intermediate level by latching the telephone lines at a voltage sufficiently low to maintain the connection with the called or calling party.

10 Claims, 3 Drawing Figures

HOLD CIRCUIT FOR TELEPHONE

This invention relates to telephony, and more particularly to a simplified hold circuit which may be used in conjunction with telephones for providing a hold feature thereto.

Telephones having a hold feature are generally known, but are usually found in the context of a private automatic exchange normally incorporating multi-line pushbutton telephones.

While the ordinary domestic telephone installation is less complex than the systems referred to above, in many cases a hold feature would be desirable if such feature could be achieved at a reasonable cost. It is noted that multi-line telephones including the normal pushbutton arrangement with hold feature are available for domestic installation, but generally require an additional monthly charge and are, thus, somewhat difficult to justify.

In view of the foregoing, it is a general aim of the present invention to provide a hold circuit for a single line telephone which may be economically purchased and simply installed.

In accomplishing the foregoing, it is an object of the present invention to provide a sensing and latching circuit disposed across the phone lines adapted to latch the lines when required by any of a plurality of hold actuating circuits, and further adapted to release the hold condition when any of the telephones connected to the line are taken off-hook.

A more detailed object of the invention is to provide a single electronic sensing and latching circuit disposed across the telephone lines for responding to the voltage on the lines, operating in conjunction with a plurality of hold actuating circuits for imposing a voltage on the lines not normally encountered, such voltage causing the latching circuit to switch the line to hold condition. In that regard, it is a further object to provide such as system wherein the latching circuit remains quiescent in response to the relatively high voltage on the phone lines in the on-hook condition and the relatively low voltage on the phone lines in the off-hook condition, and responds to an intermediate hold signaling voltage for latching the line in a hold condition.

Other objects and advantages will become apparent from the following detailed description when taken in conjunction with the drawings in which.

While the invention will be described in connection with a preferred embodiment, there is no intent to limit to that embodiment. On the contrary, the intent is to cover all alternatives, modifications and equivalents included within the spirit and scope of the invention as defined by the appended claims.

Figure 1:
FIG. 1 is an elevational view of a single line telephone including a hold actuating circuit exemplifying the present invention.

Turning now to the drawings, FIG. 1 shows a conventional telephone instrument 20 associated with a hold switch module 21 for providing a hold capability to the telephone. The illustrated telephone is of the push-button dial variety, including a pad of twelve pushbutton keys generally indicated at 22 for use in dialing the numbers associated with other stations. The receiver 24 is shown in the on-hook condition, resting in the cradle of the telephone instrument. By way of definition, the telephone is said to be in the off-hook condition when the receiver 24 is removed from the cradle. Although not illustrated in the drawing, the receiver 24 is connected by means of wire 25 to the telephone instrument itself. The illustrated telephone is of the single line variety, including a wire 26 to be connected by means of a plug, direct wiring, or the like to an incoming telephone line. Although the illustrated telephone is of the push-button dial variety, it will become apparent that the invention is also usable with conventional rotary dial telephones.

The hold switch module 21 is preferably housed in a suitable enclosure 30 which, due to the division of the hold signaling from the sensing and latching circuitry, may be significantly miniaturized. While this divided arrangement is preferred, it is noted that in certain circumstances it may be desirable to house the sensing and latching circuitry in one of the hold signaling modules. A momentary contact pushbutton switch 31 projects from the housing 30 affording the user the ability to place a call on hold when desired. As will become more apparent, to place a call on hold, the user simply depresses the pushbutton 31 and, while holding such pushbutton in the depressed condition replaces the receiver 24 in the cradle. The pushbutton 31 may then be released, the call being retained on hold by circuitry to be described below. The call may be retrieved by simply removing the receiver from the cradle of any telephone in the system connected to the telephone line which is then being maintained in the hold condition. As a result, a party may answer a call at a telephone in one location, place the call on hold, proceed to another extension telephone, remove the hand set of that telephone from the cradle and be in immediate contact with the called or calling party.

Figure 2:
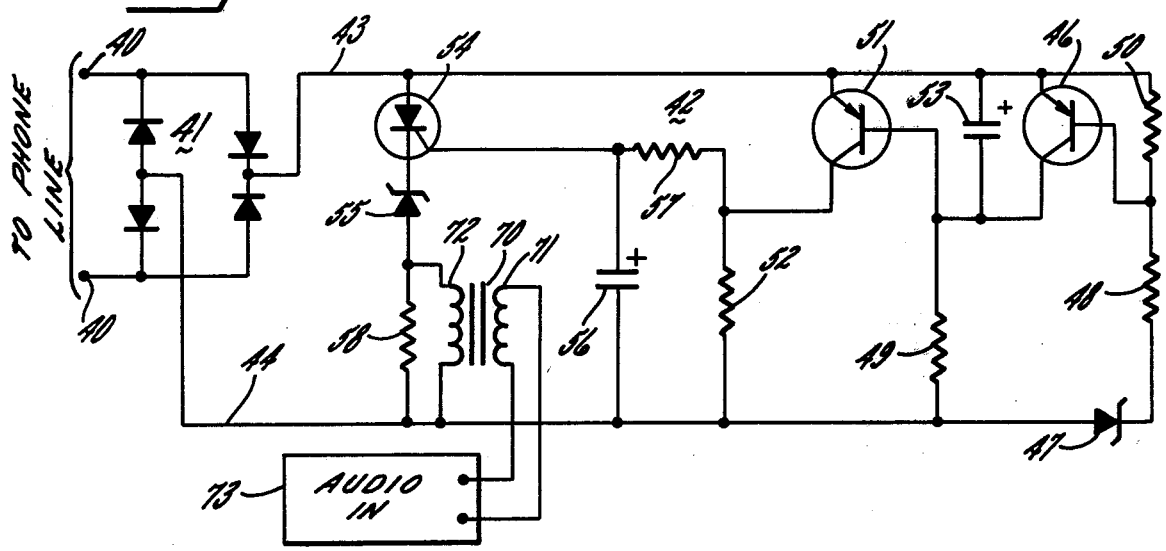
FIG. 2 is a schematic diagram showing a sensing and latching circuit constructed in accordance with the present invention.

In accordance with the invention, means are provided for monitoring the voltage on the telephone lines and for responding to a voltage on those lines not normally encountered for latching the line into the hold condition. Turning now to FIG. 2 there is illustrated one form of monitoring and latching circuit adapted to function as described above. The circuit includes a pair of input terminals 40, adapted to be coupled across the incoming telephone lines. As will become more apparent, this is the only connection made from the latching circuit to the telephone lines. It should also be noted that only one circuit as illustrated in FIG. 2 is required per incoming telephone line, independently of the number of telephones connected to that line. As a result, the circuitry illustrated in FIG. 2 may be positioned at any convenient location. Indeed, it may be so miniaturized as to be contained within a piggy-back type telephone plug, plugged into the telephone system at any one of a plurality of extension jacks, and affording the user the ability to piggy-back a telephone into that jack via the circuitry containing plug. At any rate, it is emphasized that the circuitry need not be associated with any given telephone, and need not be duplicated for all of the telephones, thereby allowing the hold signaling module at each telephone to be greatly simplified.

For assuring voltage of the proper polarity for the monitoring and latching circuit irrespective of the polarity applied to the telephone lines from the central office, a full bridge 41 is interposed between the input terminals 40 and the remaining circuitry, generally indicated at 42. It is, therefore, seen that the line 43 will always be positive with respect to the line 44 independently of the polarity of voltage applied to the terminals 40.

The invention depends, in part, upon the realization that in operation, the telephone lines exhibit two distinct voltages (or voltage ranges) depending upon the on-hook or off-hook condition of the telephone. When the telephone is on-hook, the voltage across the terminals 40 is generally at a first, relatively high level, usually at about 48 volts. The actual voltage varies, of course, in dependance upon the particular equipment used at the central office, the distance between the particular telephone in interest and the central office, and other such factors. By way of contrast with the relatively high on-hook voltage, when the telephone is in the off-hook condition, the voltage across the terminals 40 drops to a relatively low level, on the order 8 to 12 volts. The circuitry 42 detects both the high voltage and the low voltage conditions, and maintains the latching circuitry in a quiescent condition in response thereto. The circuitry further detects a voltage not normally encountered, imposed for the purposes of establishing a hold condition, and in response thereto latches the line by drawing sufficient current to maintain the busy condition of the line.

For sensing the on-hook condition of the telephone, means are provided for establishing a high voltage threshold and sensing when the voltage on the lines exceeds that threshold. To that end a transistor 46 and its associated components are arranged so that the transistor is biased into conduction when all of the telephones coupled to the incoming line are on-hook. The base circuit of the transistor 46 includes a threshold setting device, shown herein as Zener diode 47 for establishing a high threshold above which the transistor will be conductive. For example, the Zener diode 47 may be chosen to have a breakdown level of about 28 volts, assuring that when the incoming telephone line is unbusy and all telephones are on-hook (causing the line 43 to be positive with respect to the line 44 by about 48 volts) base current will flow through the resistor 48 and Zener diode 47, driving the transistor 46 into saturated conduction, and maintaining the collector thereof at approximately the level of line 43. Resistor 49 is the load resistor for transistor 46 while resistor 50 is the base return resistor. With transistor 46 conducting as described above, transistor 51, having its base connected to the collector of transistor 46 is maintained in the cut-off condition. However, if the voltage imposed across lines 43 and 44 falls below the threshold established by Zener diode 47, there will be no path for base current flow for transistor 46, and accordingly, that transistor will be switched into cut-off. As a result, current flow in the collector circuit will cease, allowing base current flow in transistor 51 through resistor 49, and clamping the collector of transistor 51 to approximately the level of line 43. Collector current flow of transistor 51 is through load resistor 52 in the collector circuit thereof. Capacitor 53 coupled across the collector-emitter of transistor 46 prevents false triggering of the hold circuit such as when dialing a number in rotary dial-pulsing systems or when ringing voltage is applied.

It will now be appreciated that in the non-busy, on-hook condition, the relatively high voltage across the phone lines will maintain transistor 46 in conduction which, in turn, will maintain transistor 51 cut-off. However, whenever any of the telephones coupled to the telephone line are off-hook, the relatively low voltage will cause transistor 46 to switch off which, in turn, will allow transistor 51 to conduct. It should also be noted at this point that the biasing network of transistor 46 is arranged so that the current drawn by the circuit with all telephones on-hook is negligible. Further, it should be appreciated that in all conditions the circuitry is powered from the telephone line, requiring no separate source of power.

For selectively latching the telephone lines in a hold condition, means are provided for establishing an off-hook low threshold level and, when that threshold level is exceeded in the off-hook condition, for switching a holding impedance across the telephone lines. To that end, the circuitry of FIG. 2 includes a latching thyristor, shown herein as SCR 54 having a low threshold establishing device, such as Zener diode 55, in the load circuit thereof. The breakdown voltage of the Zener diode 55 is selected so that the SCR 54 remains non-conductive whenever a telephone connected to the lines is in its normal off-hook condition. For example, in systems wherein the off-hook voltage is in the range between 8 and 12 volts as described above, the breakdown voltage of Zener diode 55 may be selected as 12 volts.

It is seen that the gate circuit of SCR 54 includes noise suppression capacitor 56 and a resistor 57 coupled to the collector of transistor 51. As a result, the SCR 54 will remain non-conductive in both the normal off-hook and on-hook conditions. In the on-hook condition, the transistor 51 will be cut off thereby preventing the flow of gate current to SCR 54. In the normal off-hook condition, because the collector of transistor 51 is at approximately the same voltage level as line 43 (less than 12 volts positive with respect to line 44) and because of the presence of low threshold establishing Zener diode 55, the cathode circuit of SCR 54 will appear as a very large impedance, preventing the SCR from switching into conduction.

Figure 3:
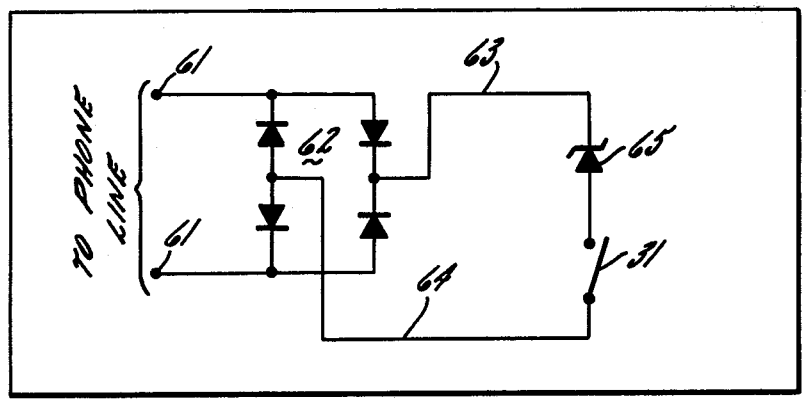
FIG. 3 is a schematic diagram showing a hold signaling circuit for use with the sensing and latching circuit of FIG. 2.

As will become more apparent from the description of FIG. 3, when it is desired to impose to hold condition across the telephone lines, the telephone lines are temporarily switched to a voltage level lower than the high threshold but higher than the low threshold, such voltage level causing the SCR 54 to switch into conduction. Assuming, for example, that when it is desired to switch into the hold condition, the telephone lines are held at approximately 15 volts, it is seen that with transistor 51 conducting, and with line 43 positive with respect to line 44 by about 15 volts, the anode-cathode circuit of SCR 54 will be forward biased, and gate current will flow into the SCR, thereby causing it to latch into conduction. The SCR will remain latched until the condition on the telephone lines is modified to reduce the voltage to a level below the low threshold level set by Zener diode 55, thereby terminating anode-cathode current flow. This may be accomplished by lifting the receiver of any telephone connected to the line thereby dropping the line voltage to 12 volts or less.

In carrying out the invention, one or more of the telephones in the system are provided with means for raising the voltage on the telephone lines to an intermediate level, thereby to actuate the above-described latching circuit. Turning now to FIG. 3, there is shown a preferred embodiment of such circuitry. It is emphasized that whereas only a single latching circuit as illustrated in FIG. 2 is required in the system, a virtually unlimited number of signaling circuits as shown in FIG. 3 may be provided, each with a capability to control the single latching circuit. As shown in the drawings, the signaling circuit, generally indicated at 60, includes a pair of terminals 61 for connection across the telephone lines. As with the latching circuit, the signaling circuit includes a full wave bridge interposed between the telephone lines and the remaining circuitry for assuring that, irrespective of the voltage imposed upon the telephone lines from the central office, the line 63 will always be positive with respect to the line 64. The signaling circuit includes the switch 31 (described with reference to FIg. 1) and an intermediate voltage level establishing device, shown herein as Zener diode 65. The breakdown voltage of the Zener diode 65 is selected at an intermediate level, not normally encountered in use of the telephone but capable of maintaining an existing connection, such as 15 volts. In order to impose this intermediate level on the telephone lines, the user need simply depress the switch 31, and while holding the switch depressed replace the receiver into the on-hook condition. Normally, replacing the receiver will cause the telephone lines to return to their on-hook relatively high voltage level. However, because switch 31 is depressed, the Zener diode 65 is imposed across the telephone lines, and holds those lines to the level established by the Zener. Because the breakdown level of Zener diode 65 is higher than that of Zener diode 55, and because transistor 51 is conducting, the SCR 54 will be switched into conduction, thereby clamping the telephone line at a level established by the forward drop of SCR 54, the breakdown voltage of Zener diode 55, and the minor voltage drop across the SCR load resistor 58. The switch 31 need be maintained closed for only an instant following return of the telephone receiver to the cradle and may be released as soon as the SCR 54 switches into conduction. Current flow from the telephone lines through the SCR 54 and its load circuit (including Zener diode 55 and resistor 58) maintains the telephone lines latched at a voltage indicating to the central office that the lines are busy even in spite of the fact that all of the telephones and extension telephones coupled to the phone lines are on-hook. The hold condition is simply released by lifting the receiver of any telephone coupled to the telephone lines, causing the lines to switch to their low level, below the low threshold established by Zener diode 55, causing the SCR 54 to resume its nonconductive state and allowing conversation to continue.

According to one feature of the invention, a music-on-hold feature may be provided by simply coupling a music audio signal into the latching circuit so that when the latching circuit is conductive, the current flow therethrough will be modulated by the audio signal. To that end, a transformer 70 is provided having a primary 71 coupled to an audio signal and the secondary 72 coupled in the load circuit of latching SCR 54. The audio signal producing means 73 may take any convenient form, such as a radio, tape recorder, or the like. As a result, whenever the SCR 54 is conducting (only, it is recalled, in hold condition) the music or audio signal applied to the primary 71 will be transferred to the secondary 72 and modulate the current flow in the telephone line so that the called or calling party will hear that audio signal.

I claim as my invention:

1. A hold circuit for use with a telephone, said telephone being connected to a telephone line, said hold circuit comprising in combination, sensing and latching circuit means coupled to said telephone line, said sensing and latching circuit means including means for establishing a high threshold and sensing a voltage on said telephone line exceeding said high threshold indicating an on-hook telephone condition, means for establishing a low threshold and sensing a voltage on said telephone line below said low threshold indicating an off-hook telephone condition; hold signaling means connected to said telephone line and including a hold switch for establishing a voltage on said telephone line intermediate said low and high thresholds, and latching circuit means in the sensing and latching circuit responsive to said intermediate voltage level on said telephone line for latching said telephone line into a hold condition.

2. The hold circuit as set forth in claim 1 including a plurality of telephones connected to said telephone line, said hold signaling means including a plurality of hold switches individual ones of which are associated with the respective telephones, each of said hold switches being adapted to switch said telephone line to said intermediate level, whereby the sensing and latching circuit is controlled from a plurality of telephones.

3. The hold circuit as set forth in claim 1 further including a transformer having its secondary coupled in said latching circuit means, means for coupling an audio signal to the primary of said transformer, whereby said audio signal is imposed on said telephone line when said line is latched into the hold condition.

4. A hold circuit for use in a telephone system, said system having a pair of telephone lines at least one telephone coupled thereto, said hold circuit including a single sensing and latching circuit and hold signaling circuit means, said sensing and latching circuit including high threshold circuit means for sensing a voltage on said telephone lines exceeding a high threshold indicating that the telephone in said system is in the on-hook condition, a thyristor coupled in a latching circuit across said telephone lines, said high threshold circuit means being coupled to the gate of said thyristor to provide gate drive to said thyristor when the voltage on said telephone lines is below said high threshold, said latching circuit including low threshold circuit means for preventing said thyristor from switching into conduction when the voltage on said telephone lines is below a low threshold indicating that the telephone in said system is in the off-hook condition, said hold signaling circuit means including a hold switch and means responsive to actuation thereof for establishing an intermediate level on said telephone lines, said intermediate level being above said low threshold but below said high threshold thereby to cause said thyristor to switch into conduction to impose a holding impedance across said telephone lines.

5. The hold circuit as set forth in claim 4 wherein the telephone system includes a plurality of telephones connected to said telephone lines, and including a plurality of hold signaling circuits individual ones of which are associated with the respective telephones, each of said hold signaling circuits being adapted to switch said telephone lines to said intermediate level, whereby the single sensing and latching circuit is controlled from a plurality of telephones.

6. The hold circuit as set forth in claim 4 further including its transformer having a secondary coupled in said latching circuit, means for coupling an audio signal to the primary of said transformer, whereby said audio signal is imposed on said telephone line when said thyristor is conductive.

7. The hold circuit as set forth in claim 4 wherein said high threshold circuit means includes a transistor switch, Zener diode means having a breakdown level for establishing said high threshold, said Zener diode being coupled in the biasing circuit of said transistor switch to cause said switch to be conductive when the voltage on said telephone lines exceeds the breakdown level of said Zener diode, and means coupling said transistor switch to the gate of said thyristor for supplying gate current when said first transistor switch is non-conductive.

8. The hold circuit as set forth in claim 7 wherein said low threshold circuit means includes a second Zener diode coupled in said latching circuit, said second Zener diode having a breakdown level establishing said low threshold for preventing said thyristor from switching into conduction when the voltage on said telephone lines is below said low threshold.

9. The hold circuit as set forth in claim 8 further including its transformer having a secondary coupled in said latching circuit, means for supplying an audio signal to the primary of said transformer, whereby the audio signal is coupled to said telephone lines when the thyristor is conductive.

10. The hold circuit as set forth in claim 4 wherein said thyristor and second Zener diode are serially connected to that a hold condition may be released by taking one of said telephones off-hook.

* * * * *